(12) United States Patent
Miller et al.

(10) Patent No.: US 7,689,626 B2
(45) Date of Patent: Mar. 30, 2010

(54) SYSTEM AND METHOD FOR LOCATING LOG RECORDS IN MULTIPLEXED TRANSACTIONAL LOGS

(75) Inventors: Thomas Jay Miller, Bellevue, WA (US); Dexter Paul Bradshaw, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1027 days.

(21) Appl. No.: 10/159,228

(22) Filed: May 31, 2002

(65) Prior Publication Data

US 2003/0225585 A1 Dec. 4, 2003

(51) Int. Cl.
*G06F 11/00* (2006.01)
(52) U.S. Cl. .................. 707/783; 707/781; 714/15
(58) Field of Classification Search ........... 707/8–10, 707/201–202, 1; 714/15; 718/1, 101; 709/229; 715/14
See application file for complete search history.

(56) References Cited

U.S. PATENT DOCUMENTS

| | | | |
|---|---|---|---|
| 5,544,321 A * | 8/1996 | Theimer et al. ............. 709/226 |
| 5,737,600 A * | 4/1998 | Geiner et al. ............... 707/200 |
| 6,173,293 B1 * | 1/2001 | Thekkath et al. ............ 707/201 |
| 6,542,932 B1 * | 4/2003 | Brinnand et al. ............ 709/229 |
| 6,801,938 B1 * | 10/2004 | Bookman et al. ........... 709/224 |
| 2002/0120757 A1 * | 8/2002 | Sutherland et al. .......... 709/229 |
| 2003/0163635 A1 * | 8/2003 | Aasheim et al. ............. 711/103 |
| 2005/0028171 A1 * | 2/2005 | Kougiouris et al. ......... 719/318 |

OTHER PUBLICATIONS

*ARIES: A Transaction Recovery Method Supporting Fine-Granularity Locking and Partial Rollbacks Using Write-Ahead Logging*; C. Mohan, IBM Almaden Research Center, Don Haderle, IBM Santa Teresa Laboratory and Bruce Lindsay, Hamid Pirahesh and Peter Schwarz, IBM Almaden Research Center, ACM Transactions on Database Systems, vol. 17, No. 1, Mar. 1992.

* cited by examiner

*Primary Examiner*—Tim T. Vo
*Assistant Examiner*—Mahesh H Dwivedi
(74) *Attorney, Agent, or Firm*—Merchant & Gould (57) ABSTRACT

A common logging system (a "virtual logging system") that presents to one or more log clients the appearance that each log client is interacting with a dedicated logging system. In reality, the virtual logging system is multiplexing virtual log streams, including log records, for each log client into a single transactional log. In particular, the invention is directed at a scheme for mapping virtual identifiers that a client uses in connection with the client's own records to physical identifiers that represent the physical location of the client's records in the single transactional log

20 Claims, 10 Drawing Sheets

FIGURE 3 log sequence number

SYSTEM AND METHOD FOR LOCATING LOG RECORDS IN MULTIPLEXED TRANSACTIONAL LOGS

BACKGROUND OF THE INVENTION

The notion of a transaction is an important concept for transactional systems, such as database management systems, recoverable file systems and transaction-based operation systems. Briefly stated, a transaction is an action or set of actions that guarantees the ACID (Atomicity, Consistency, Isolation and Durability) properties. Transactional logging involves maintaining a transactional log that durably records a time serial history of transactions in a system. A transactional log provides information for restoring a system to a particular state in time prior to a system failure. ARIES (Algorithm for Recovery and Isolation Exploiting Semantics) is one very popular recovery scheme used for restoring a failed system through transactional logging. To be ARIES compliant, a transactional logging system must meet certain conditions that enable the ARIES recovery scheme to function. For example, ARIES requires that log sequence numbers (identifiers that are used to specify a location of each record in a physical log) be strictly increasing.

Traditionally, ARIES compliant logging systems have used a dedicated log to support a single log client. ARIES compliance is desirable because the resulting logging system is typically very robust and achieves a high performance level. However, the inventors have determined that the high level of reliability of a single log client using a dedicated logging system may actually result in overall performance degradation for a computing environment where multiple log clients are using multiple dedicated logging systems. One of the reasons for this is that each dedicated logging system independently incurs input/output (I/O) overhead to write and retrieve information. The I/O overhead results in adverse performance impact, and the impact is cumulative for each of the independent logging systems. An improved logging system is desirable that could overcome some of these performance problems. However, the development of an improvement to the existing scheme of transactional logging has met several hurdles. The inventors have determined that one hurdle to an improved transactional logging system is the need to uniquely identify each log client with log records that may be stored on permanent storage in a manner consistent with the ARIES recovery scheme.

SUMMARY OF THE INVENTION

Briefly stated, this invention is directed toward a computer-implemented method for locating a log record in a transactional log associated with a transactional logging system. The transactional log may include regions. The log record is associated with a particular client. The computer-implemented method includes receiving from the client a virtual identifier that identifies the log record. A correct region is determined using a set of owner pages, each being associated with a region in the transactional log. Using the owner page associated with the correct region, the virtual identifier is mapped to a log block physical identifier for the log record in the correct region. The physical identifier corresponds to the location of the log record in the transactional log.

In another aspect, the invention is directed toward a computer-implemented method for identifying a current log record in a transactional log associated with a transactional logging system. The current log record is associated with a client. The transactional log includes a last log record that is also associated with the client. The last log record was appended to the transactional log before the current log record. The computer-implemented method includes assigning to the last log record a physical identifier that identifies a location within the transactional log. The computer-implemented method also includes assigning to the current log record a virtual identifier that corresponds to the physical identifier. The virtual identifier associates the current log record with a virtual log, which is presented to the client by the transactional logging system as a dedicated log.

In yet another aspect, the invention is directed toward a computer-implemented method for locating a log record in a transactional log. The transactional log includes regions, each of which is associated with an owner page. The computer-implemented method includes receiving a request from a client that relates to a target log record, which is indicated by a virtual identifier. The method determines which of the regions in the transactional log is a correct region using the associated owner pages. Each of the owner pages includes information identifying a range of log blocks within the associated region corresponding to the client. The correct region has a range that includes the target log record. The virtual identifier is compared to a list of physical identifiers that have previously been returned to the client until a matching physical identifier that corresponds to the virtual identifier is located.

In a further aspect, the invention is directed toward a computer-readable medium encoded with a data structure. The data structure includes a client data field that contains data representing clients associated with a transactional log. The transactional log contains log blocks, each of which is identified by a different virtual identifier and is associated with exactly one of the clients. The data structure also includes a range data field that contains data representing virtual identifier ranges. Each of the virtual identifier ranges is associated with exactly one of the clients and describes a range of virtual identifiers for log blocks associated with the client.

In yet a further aspect, the invention is directed toward a computer-readable medium encoded with a data structure. The data structure comprises multiple sector records. Each sector record includes a client data field that identifies particular client, which owns the sector record. Each sector record also includes a log record offset that locates the sector record within a sequence of sector records of a log block. Furthermore, each sector record is associated with a physical identifier. Also, a particular physical identifier for a sector record corresponds to a virtual identifier of another sector record, where the virtual identifier of the other sector record is different from the physical identifier of the other sector record.

DETAILED DESCRIPTION OF THE PREFERRED EMBODIMENT

Briefly stated, the present invention enables a common logging system (a "virtual logging system") that presents to one or more log clients the appearance that each log client is interacting with a dedicated logging system. In reality, the virtual logging system is multiplexing virtual log streams, including log records, for each log client into a single transactional log. In particular, the invention is directed at a scheme for mapping virtual identifiers that a client uses in connection with the client's own records to physical identifiers that represent the physical location of the client's records in the single transactional log. This mapping scheme allows the client to perform logging as if it is interacting with its own dedicated log while benefiting from the efficiency associated with using a multiplexed logging system.

Virtual Logging System

Figure 1:
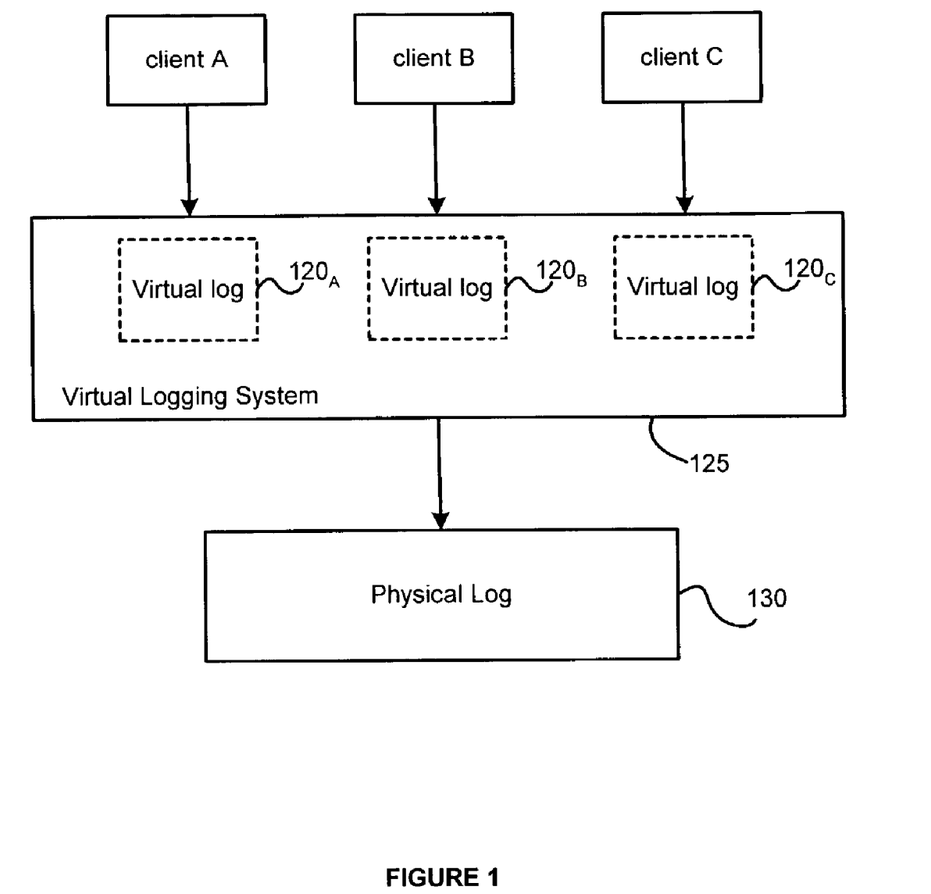
FIG. 1 illustrates a graphical overview of a virtual logging system in accordance with the invention.

FIG. 1 illustrates a graphical overview of a virtual logging system in accordance with the invention. As shown in the figure, virtual logging system 125 provides transactional logging services to each of multiple clients, such as clients A, B and C. Each client is a computer application program that maintains a log through the virtual logging system. Examples of the clients may be a database application, a transactional file system, a transaction management system or the like. Virtual logging system 125 provides the illusion to each of clients A, B, and C that a separate, dedicated log is being maintained for each client. In other words, clients A, B, and C send log records to the virtual logging system 125 with the expectation that the log records are stored in dedicated logs. For the purpose of this discussion, the illusory dedicated logs are referred to as "virtual logs," represented in the figure as virtual logs $120_{A-C}$. In actuality, the virtual logging system 125 multiplexes the log records from each client into a single physical log 130. The physical log is then stored in a storage unit, such as a hard disk drive or the like.

It will be appreciated that in order for each client to interact with its log records, identifiers must be provided to each client to locate the client's log records in the physical log. Those skilled in the art will appreciate that Log Sequence Numbers (LSNs) are typically used for this purpose. At this point, the LSN can be thought of as a monotonically increasing value assigned to each log record and returned to the client when the log record is written to the physical log. However, it will be appreciated by those with knowledge of the ARIES recovery scheme that the actual LSN assigned to the log records in the physical log cannot accurately be used by each client to locate a log record in the physical log in a multiplexed logging scheme. The reason for this is that the log records for one client may consume physical LSNs (i.e., the LSNs associated with the data physically stored) between appends of another client. In other words, in the virtual logging system, no client can be assured that the next physical LSN actually belongs to that client because a second client may have written log records to the physical log since the first client.

To address this problem, the virtual logging system 125 implements a mapping scheme between physical identifiers that represent the location of a client's log records in the physical log and virtual identifiers (known to the client) that represent where in a virtual log the client's records are located. To retrieve log records from the log, a client passes a virtual identifier for the log records to the virtual logging system 125. The virtual logging system 125 uses the mapping scheme to convert the virtual identifier to a physical identifier to locate the pertinent log records in the physical log 130. This mapping scheme will be described in greater detail below.

Virtual Logging Process

Figure 2:
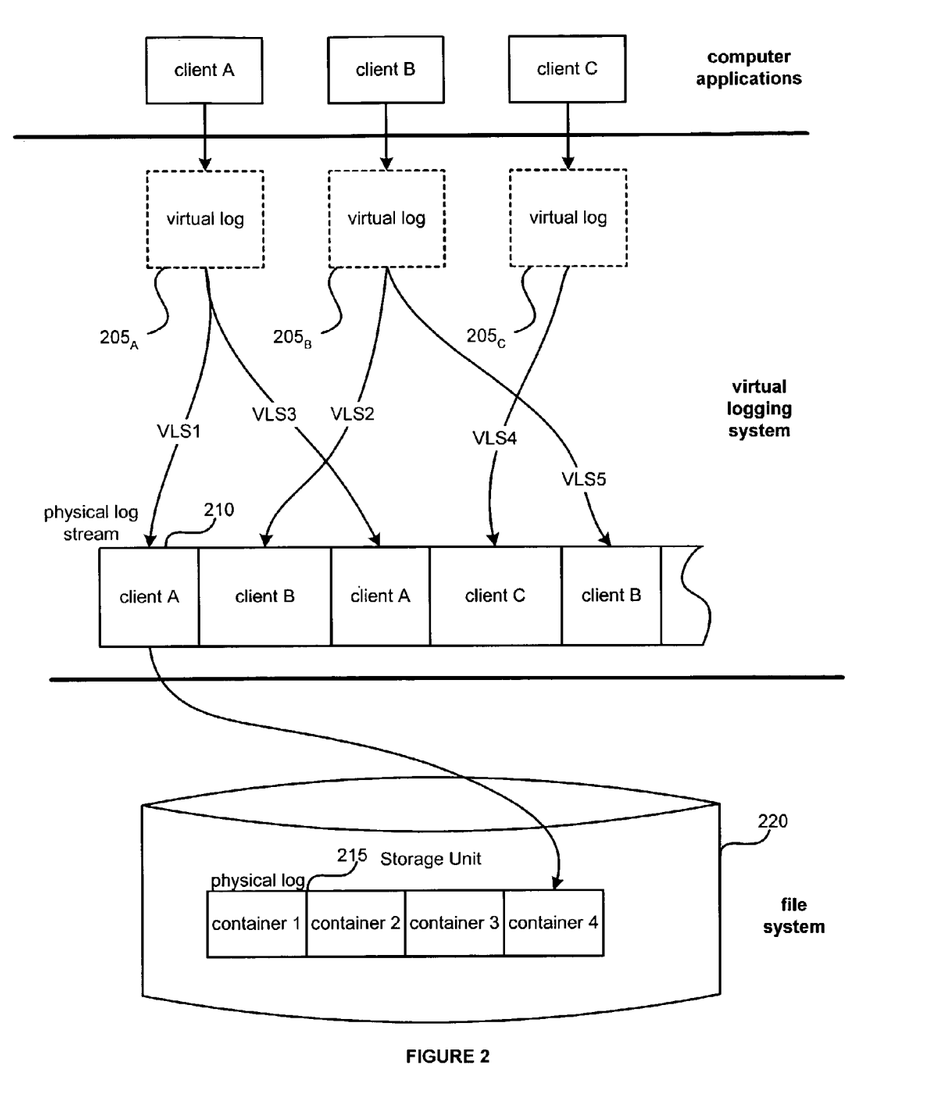
FIG. 2 is a graphical representation of how log records are stored to a physical log.

FIG. 2 is a graphical representation of how log records are stored to a physical log. Clients A, B, and C interact with a virtual logging system in accordance with the invention. Each client interacts with a virtual log $205_{A-C}$, which the client believes to be a dedicated log. Actually, virtual logging system 125 gathers log records of each client and combines the log records into a virtual log stream. Each virtual log stream is multiplexed into physical log stream 210. Physical log stream 210 is appended to physical log 215 stored in storage unit 220. As shown in the figure, the physical log 215 may be stored in multiple file containers in storage unit 220.

As mentioned, each client writes log records to and retrieves records from its corresponding virtual log $205_{A-C}$. In accordance with the virtual logging system, the log records are actually written to and retrieved from a physical log stream 210. In other words, client A may write log records in virtual log $205_A$, which are written to the first location in the physical log stream 210. Subsequently, client B writes log records to virtual log $205_B$, which are appended to the physical log stream 210 in the second location. Client A may append additional log records to virtual log $205_A$, which are written to the physical log stream 210 in the third location, and so on for the life of the physical log. Thus, the physical log stream 210 contains each of the log records from each of the virtual logs $205_{A-C}$ multiplexed into a single log stream.

At an appropriate time, the physical log stream 210 is written to a storage unit 220 as a physical log 215. In this embodiment, the physical log 215 is made up of multiple containers, which are file system files stored in the storage unit 220. The details of the file containers are described below in conjunction with FIG. 3.

Physical Log

Figure 3:
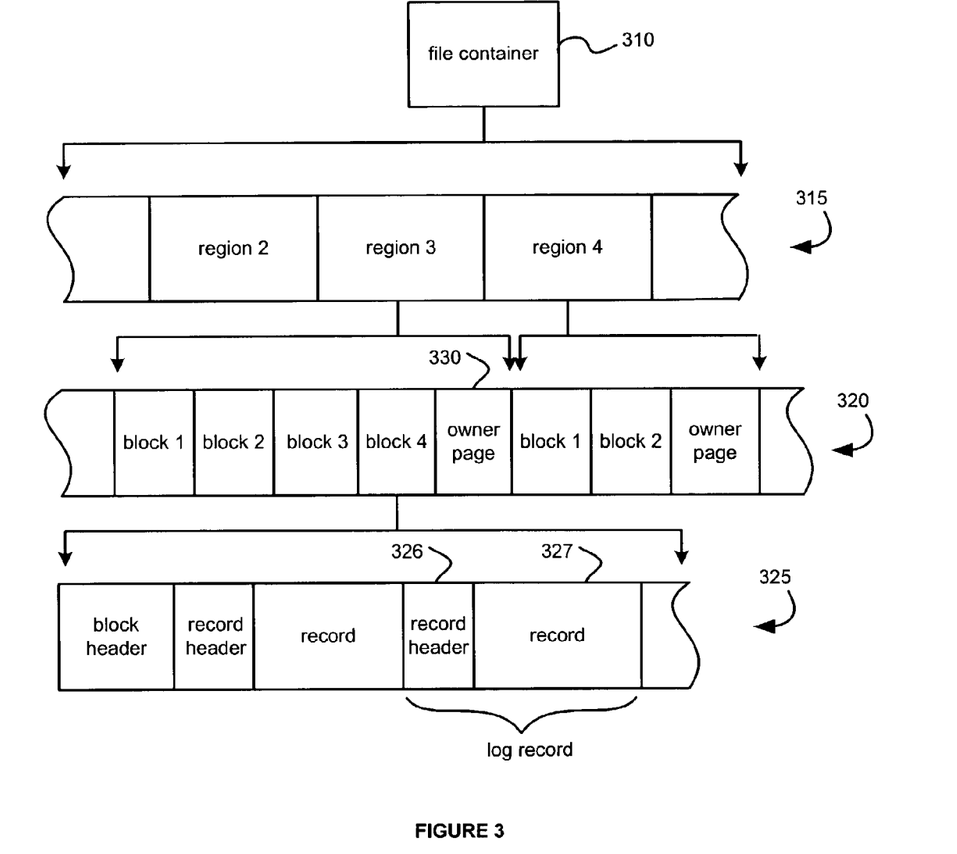
FIG. 3 is a graphical representation of an exemplary file container.

FIG. 3 is a graphical representation of an exemplary file container 310. File containers are contiguous files allocated by a file system where each contains at least a portion of the log records. A transactional log may be distributed among a series of file containers.

In this embodiment, the file container 310 is divided into regions 315. Each region is further divided into log blocks 320. A log block may overlap two regions. (Not shown) Each log block 320 contains a log block header (described below) and log records for a particular client. A log block is the smallest retrievable unit from the physical log. It will be appreciated that the log blocks for a particular client need not be, and likely won't be, contiguous. Rather, log blocks for several clients are likely multiplexed together into the single log stream.

One special log block in each region is designated as an owner page. Owner pages and their associated components will be described in more detail in conjunction with FIG. 5. Briefly stated, an owner page includes information about the ownership of each of the log blocks in a region. In one embodiment of the invention, an owner page is the last log block in every region of a physical log.

A log block is further divided into log records 325. Each log record includes a record header 326 and record data 327. The record header also contains a virtual LSN, which uniquely identifies the log record within a corresponding virtual log stream.

Figure 4:
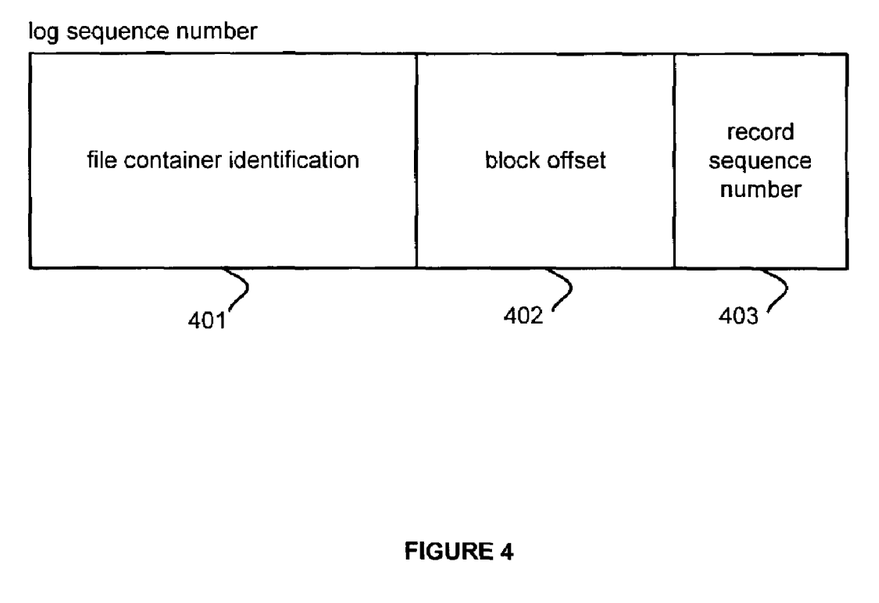
FIG. 4 is a graphical representation of a Log Sequence Number (LSN) as may be used in implementations of the invention.

FIG. 4 is a graphical representation of a Log Sequence Number (LSN) 400. As mentioned above, each log record 325 is uniquely identified by an LSN. The LSN 400 includes three components: a file container identifier 401, a sectoraligned block offset 402, and a record sequence number 403. The file container identifier 401 identifies in which file container the corresponding log record is located. The sector-aligned block offset 402 identifies a log block in a particular region where the specified log record is located. In particular, the sector-aligned block offset 402 specifies the byte offset (in multiples of the sector size) of the log block from the beginning of the file container identified. The record sequence number identifies the log record among the series of log records in the specified log block. In particular, the record sequence number specifies the record offset from the beginning of the specified log block.

In accordance with the virtual logging scheme, each log record 325 may in fact be identified by two LSNs: a virtual LSN and a physical LSN. The physical LSN describes the log record's actual location within the physical log file, and the virtual LSN describes the log record's location within the client's virtual log.

In accordance with the invention, when a client issues an instruction to append log records to the physical log, a last LSN is returned to the client that indicates the LSN at the end of the last log block appended to the log. The client may then use that last LSN when issuing subsequent appends to the physical log. In this case, the client may pass an instruction to write log records at a new LSN where that new LSN is based on the last LSN that was returned to the client. However, as discussed above, the LSN of the last appended log record may not accurately reflect the next physical LSN available to the client. The virtual logging system performs the mapping of the virtual LSN to the physical LSN so that the client continues to believe that it is using a dedicated log.

Figure 5:
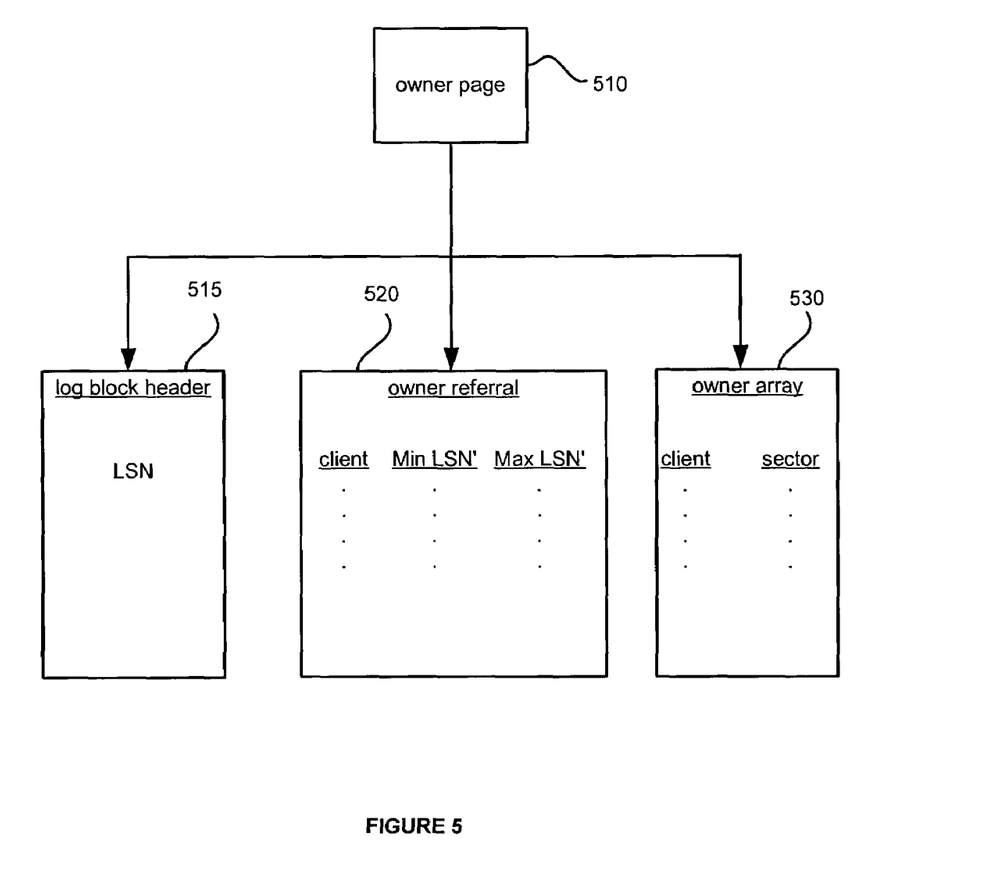
FIG. 5 is a graphical representation of one exemplary owner page.

FIG. 5 is a graphical representation of one exemplary owner page. Owner pages contain metadata associated with the owner page's corresponding region. In this embodiment, the owner page includes a log block header 515, as do each of the log blocks in the region. The log block header 515 includes a physical LSN of the owner page 510, which uniquely identifies its location in the physical log.

The owner page 510 also includes an owner referral 520. The owner referral 520 contains a range of virtual LSNs for each client that has log records in the region. The virtual LSN range is represented by a minimum virtual LSN and a maximum virtual LSN. The owner page 510 also includes an owner array 530 that identifies the client owner of each of the sectors in the owner page's region. The owner array 530 is illustrated in greater detail in conjunction with the example of FIG. 10. Briefly described, the owner array 530 includes a listing of each sector in the region and the client that owns that sector.

The information stored in the owner page 510 is used by the virtual logging system to map a virtual LSN provided by a client to a physical LSN. To facilitate the retrieval of log records, owner pages may be stored in a memory cache associated with a virtual logging system. In one embodiment of the invention, using owner pages stored in memory cache, the virtual LSN of a particular log record is mapped to a corresponding physical LSN without access to the actual physical log stored in a storage unit, thereby improving the performance of the system.

Operational Flow

Figure 6:
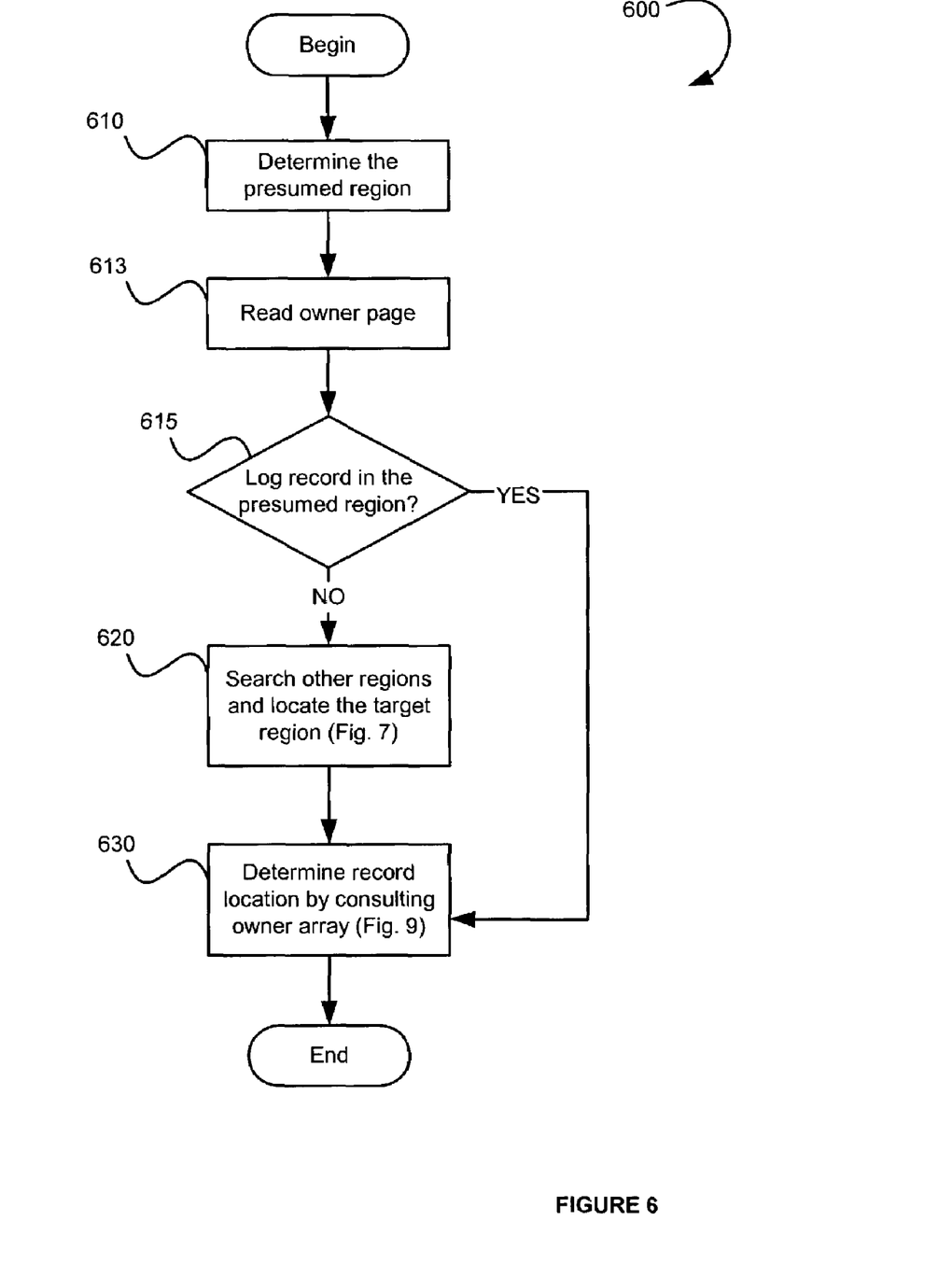
FIG. 6 is an operational flow diagram generally illustrating a process for performing virtual LSN to physical LSN mapping.

FIG. 6 is an operational flow diagram generally illustrating a process for performing virtual LSN to physical LSN mapping in accordance with one implementation of the invention. Process 600 enters from a start block where a client has issued a request to the virtual logging system to retrieve a log record identified by a particular virtual LSN. As described above, the virtual LSN may not be accurately describing the log record's location within the physical log. The process 600 begins at block 610 where a presumed region is determined. The presumed region is the region indicated by the virtual LSN. In other words, the process 600 presumes that the virtual LSN accurately describes the region in which the log record is found. The log record may not be in the presumed region because the virtual LSN may not correspond to the physical LSN. Process 600 then moves to block 613 where the owner page of the presumed region is read.

At decision block 615, a determination is made whether the requested log record is in the presumed region. The determination is made by comparing the virtual LSN with the client's virtual LSN range found in the owner referral of the owner page. If the virtual LSN falls within the range in the owner referral, the log record is in the presumed region. Otherwise, it is not in the presumed region.

If a log record is in the presumed region, the process moves to block 630. If not, process 600 continues at block 620 where the process 600 identifies the correct region where the log record is located. It is to be appreciated that only regions after the presumed region will be searched because the physical LSN is always greater than or equal to the virtual LSN. The process identifies the correct region by comparing the virtual LSN with the virtual LSN ranges of other regions later in the physical log. (See FIG. 7). When the correct region is found, the process 600 moves to block 630.

At block 630, the location of the log record is determined by consulting an owner array of the correct region's owner page. Briefly stated, the location of the log record can be determined by scanning the owner array for the sector represented by the virtual LSN. The process for identifying the physical LSN of the log record from the owner array is described in greater detail below in conjunction with FIGS. 9 and 10. When the location of the log record is determined, the physical LSN corresponding to the virtual LSN is known and the process ends.

Figure 7:
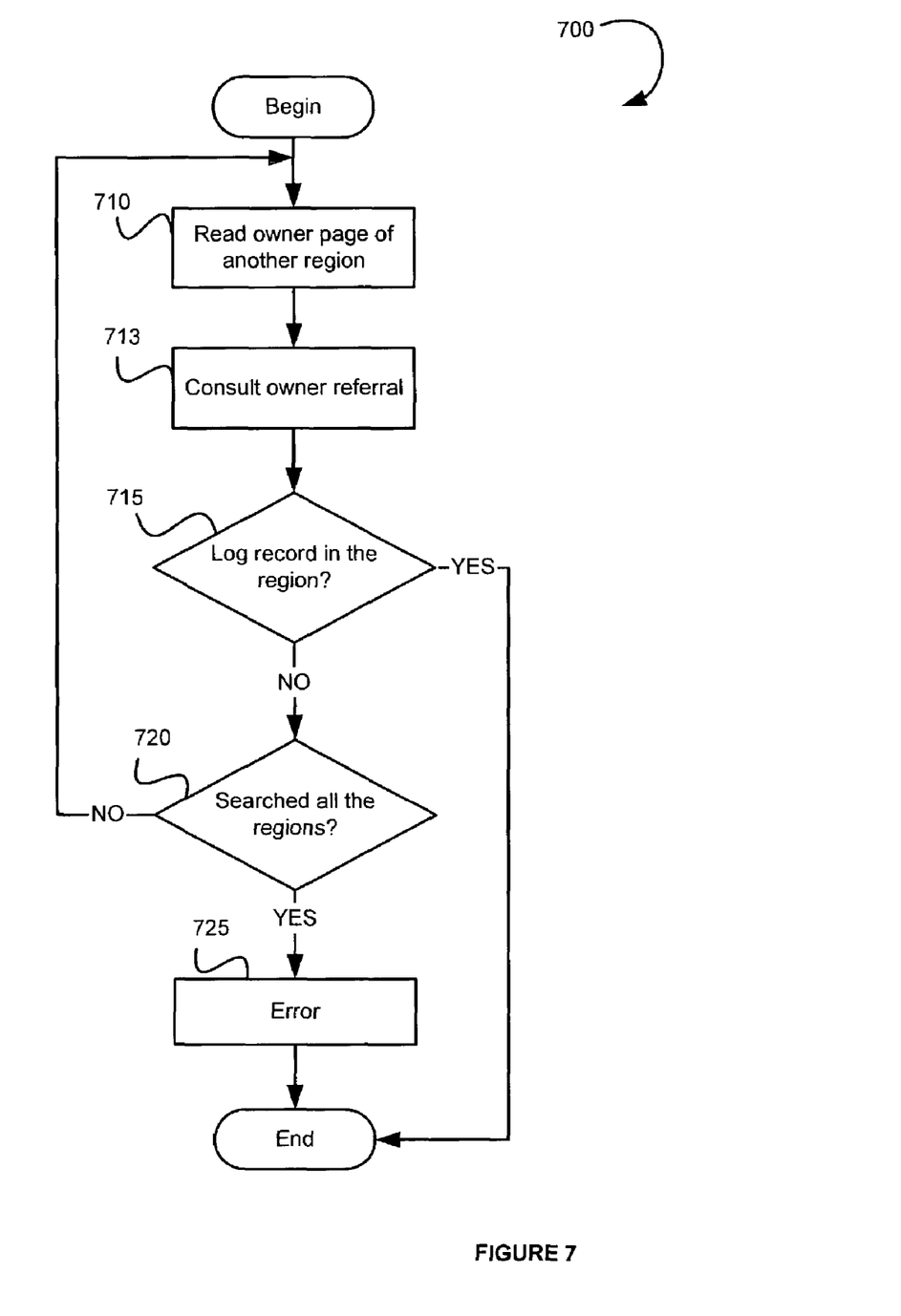
FIG. 7 is an operational flow diagram illustrating in greater detail the process of locating the correct region in a physical log where a log record identified by a virtual LSN resides.

FIG. 7 is an operational flow diagram illustrating in greater detail the process of locating the correct region in a physical log where a log record identified by a virtual LSN resides. Process 700 is entered if the region indicated by the virtual LSN does not contain the log record. At block 710, the owner page of another region, such as the region immediately following the presumed region in the physical log, is read. Process 700 then moves to block 713 where the owner referral of the read owner page is consulted.

At decision block 715, a determination is made whether the log record identified by the virtual LSN is located in the region associated with the owner page read at block 713. The determination may be made by evaluating whether the virtual LSN is within the range of LSNs for the given client as stored in the owner referral of the owner page. If so, the correct region has been located and the process ends.

If the log record is not located in the region, process 700 moves to decision block 720 where a determination is made whether all of the regions in the physical log have been searched. If not, the process returns to block 710 and iterates through additional regions until either the correct region is found (at block 715) or until no more regions remain to be searched. Many searching schemes may be used for searching the regions. In one embodiment of the invention, a backout/binary searching scheme is used. (See FIG. 8)

Returning to decision block 720, if all of the regions in the physical log have been searched, the virtual LSN is not valid because it does not identify a log record in the physical log. Process 700 moves to block 725 where an error is returned and the process ends.

Figure 8:
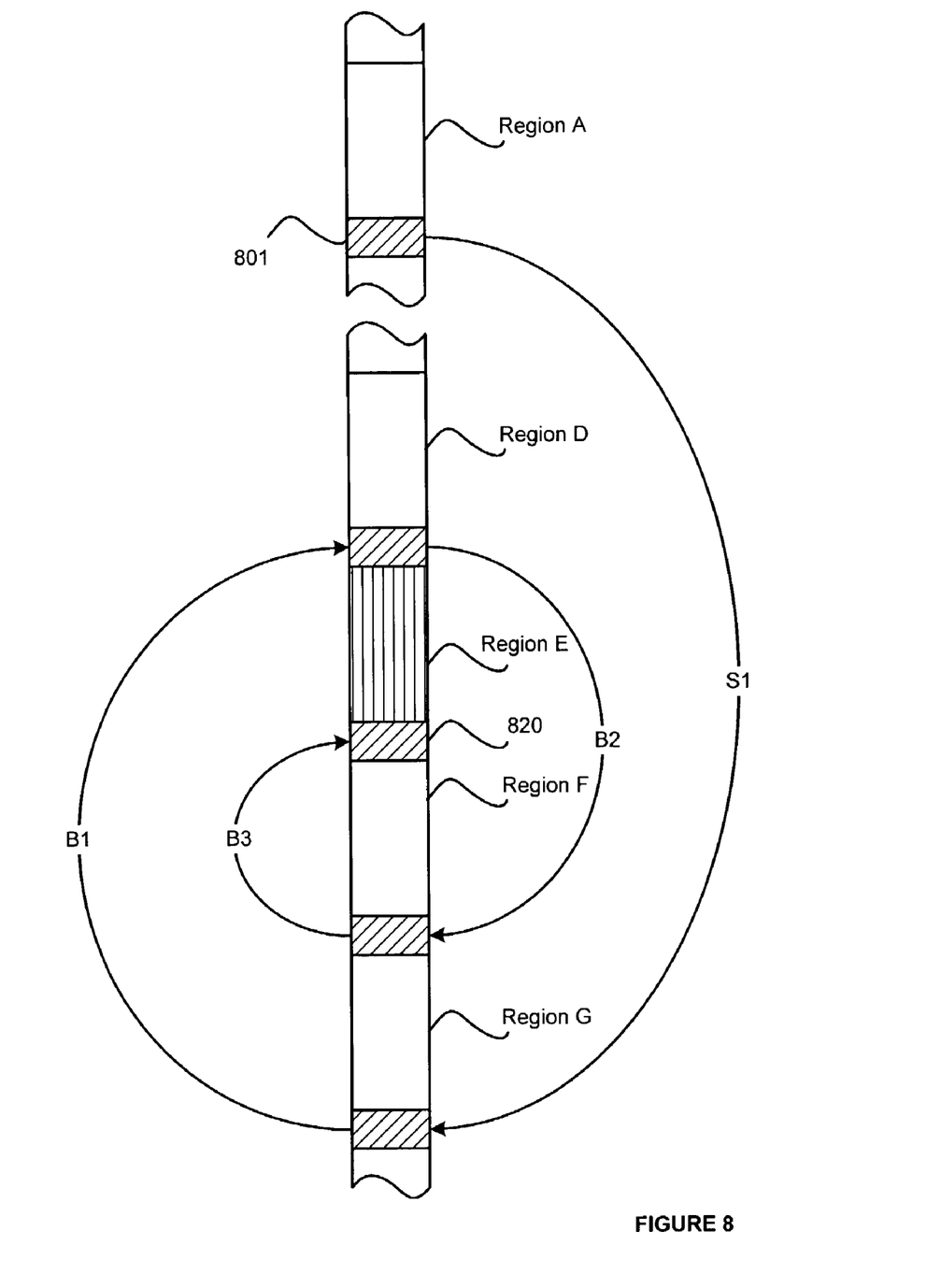
FIG. 8 is a schematic diagram showing an exemplary backout/binary search of owner pages in a physical log to identify the owner page of a correct region.

FIG. 8 is a schematic diagram showing an exemplary backout/binary search of owner pages in a physical log to identify the owner page of a correct region, which is the region in the physical log that includes the virtual LSN. The backout/binary search includes a backout step and a binary search step. The backout step moves the search forward to the correct region or a region that is located after the correct region in the physical log. The binary step is performed to locate the correct region if the backout step moves the backout/binary search past the correct region. In one specific implementation, the backout/binary search is performed on at least the portion of the physical log where the client's log records are stored.

As illustrated in FIG. 8, Region A may be the presumed region, which, as described above, is the region having a physical LSN corresponding to the virtual LSN. In addition, as illustrated in FIG. 8, Region E is the correct region (i.e., includes the requested log record). Owner page 820 is associated with Region E. It is to be appreciated that the correct region is located after the presumed region in the physical log because the physical LSN associated with the correct region is always greater than the virtual LSN associated with the presumed region, as discussed previously.

An inspection is performed to determine if the range of virtual LSNs in owner page 801 includes the virtual LSN of the requested log record. If not, the backout step causes the backout/binary search to jump forward in the physical log to the owner page of another region. As illustrated in FIG. 8, the backout/binary search may jump to the owner page associated with Region G. The backout/binary search would then again evaluate the owner page of Region G to determine whether the virtual LSN falls within the range of virtual LSNs identified in the owner page. If not, the backout/binary search continues to jump forward in the physical log and retest each successive owner page.

For the backout step, the backout/binary search could continue to jump one region at a time, or at any interval. For example, the backout/binary search could jump at a fixed interval, or the jump interval could increase exponentially with each successive jump, or the jump interval could increase in any other manner.

If the backout/binary search does not jump forward one region at a time, the backout/binary search jumps forward to other regions until it reaches a region that has a minimum virtual LSN that is greater than the virtual LSN of the requested log record. The fact that minimum virtual LSN is greater than the virtual LSN of the log record indicates that the backout/binary search has jumped past the target region. As shown in the figure, backout jump S1 leads the backout/binary search to Region G, which is located past correct region 820 in the physical log. Accordingly, the owner page associated with Region G will have a minimum virtual LSN greater than the virtual LSN of the requested log record.

If the backout/binary search jumps past the correct region, it may then employ a binary search step to locate the correct region that includes the requested log record. For instance, in performing the binary search step, the backout/binary search may walk backward in the physical log one region at a time and evaluate each respective owner page to locate the requested log record. Alternatively, the backout/binary search may search within the interval of the last jump by going back or forward at a step that is initially halfway in the interval and decreasing the step by half for each successive repetition, until the a region is found that has a minimum virtual LSN less than the virtual LSN of the requested log record.

As shown in the figure, binary search step B1 leads the backout/binary search to Region D, which is located halfway between the interval of backout jump S1. In this example, the owner page associated with Region D includes a minimum virtual LSN less than the virtual LSN of the requested log record. Accordingly, the backout/binary search must move forward again to locate the correct region. In this example, the backout/binary search moves forward (binary search step B2) by half of binary search step B1, which leads the backout/binary search to region F. Again, Region F has an owner page that reflects a minimum virtual LSN greater than the target virtual LSN. Accordingly, the backout/binary search moves backward in the physical log again by binary search step B3, which is half of binary search step B2. In this example, binary search step B3 leads the backout/binary search to the correct region (Region E).

Figure 9:
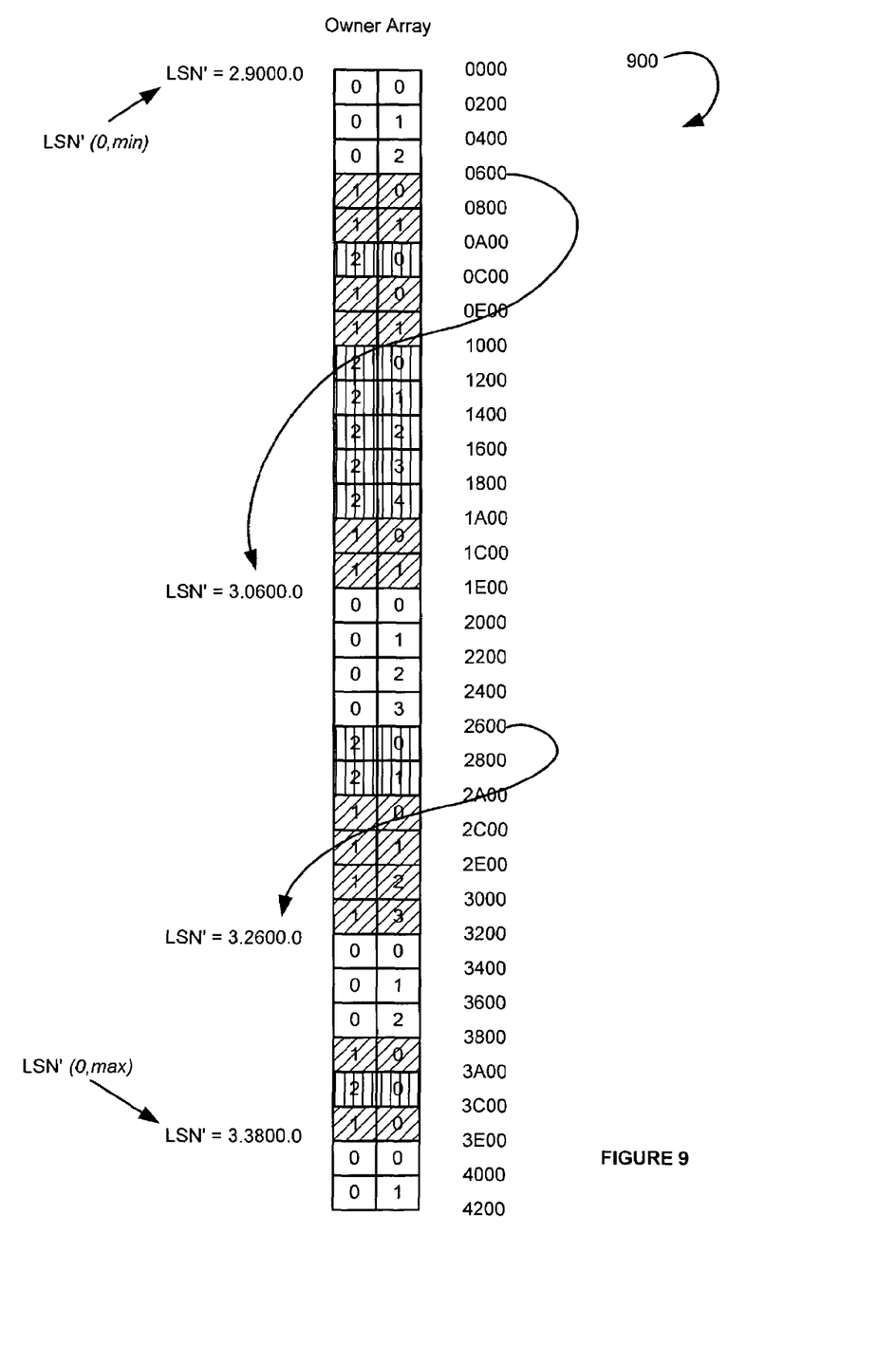
FIG. 9 is a graphical representation of an exemplary owner array associated with a region in a physical log.
Figure 10:
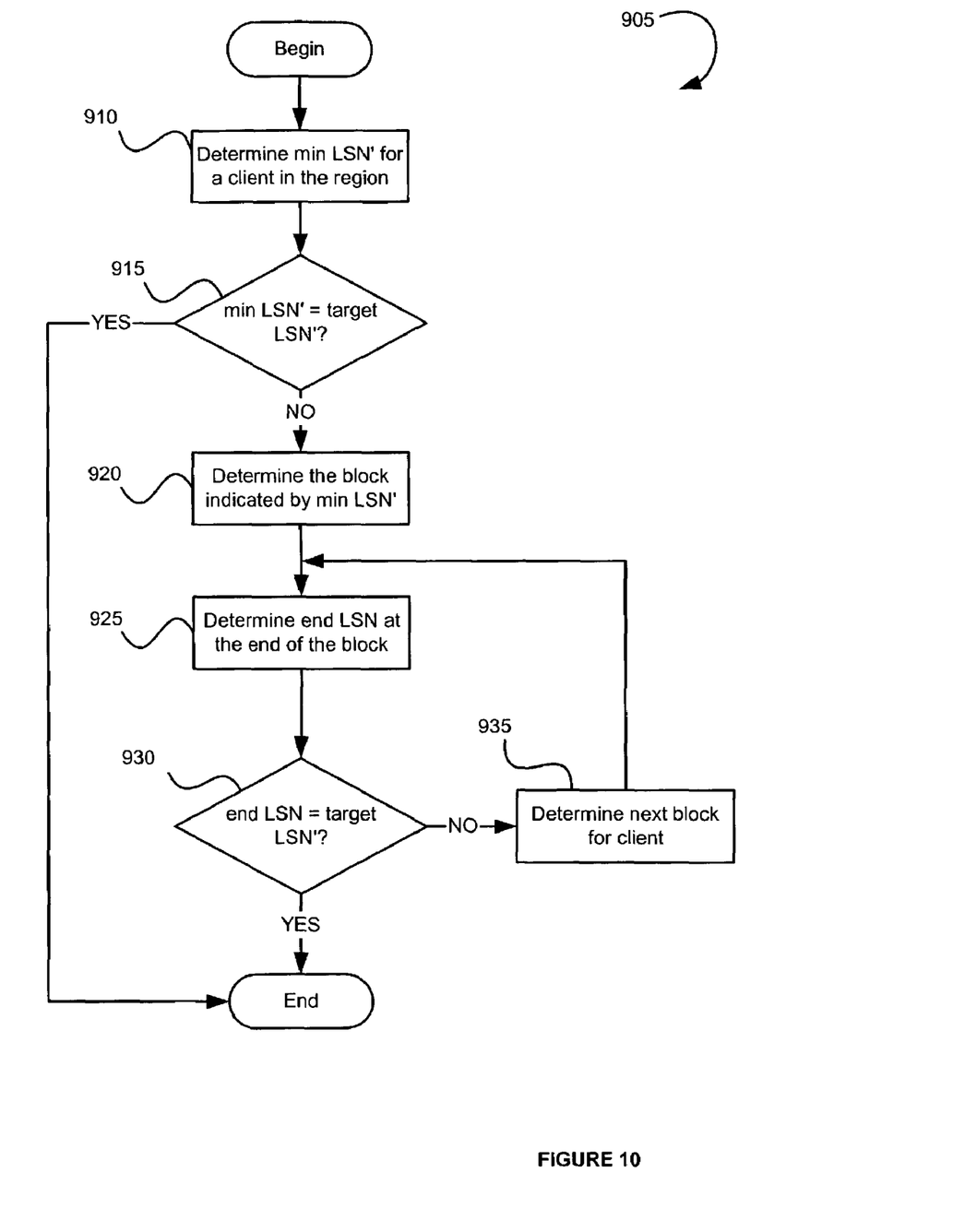
FIG. 10 is an operational flow diagram generally illustrating a process for locating a log block containing a requested log record identified by a virtual LSN once the correct region has been identified.

FIGS. 9 and 10 together generally illustrate, through one example, a process for identifying which of multiple blocks in a region includes a target log record identified by a virtual LSN. At the point of the example, the correct region including the target log record has been located, such as through the processes described above.

FIG. 9 is a graphical illustration of an exemplary owner array 900 associated with a region in a physical log. Each row of owner array 900 represents a sector (i.e. a fixed-size unit of storage in a storage medium guaranteeing atomic reads/writes from the medium) associated with the region. Owner array 900 includes identifiers arranged in two columns. In a particular row, the identifier in the left column of owner array 900 identifies the owner of the sector associated with the row. The identifier in the right column identifies a sector offset for the log block. For the purpose of illustration, a row in the owner array 900 is shown with a pattern that identifies the client that owns the sector represented by the row. More specifically, a plain pattern identifies client 0, a pattern with angular lines identifies client 1, and a pattern with straight lines identifies client 2.

In FIG. 9, the beginning of a log block is represented by a sector number of 0. For example, owner array 900 indicates that the first log block in the region is owned by client 0 and contains three sectors. The second log block in the region is owned by client 1 and contains two sectors, and so on.

For illustrative purposes, physical LSNs for each sector of the region are shown next to the right column of the owner array 900. As discussed above, the last log block in a region is an owner page, which includes a log block header containing a physical LSN. Thus, the physical LSN of the last sector in an owner array corresponds to the physical LSN in the owner page's log block header (owner pages are not represented in the owner array). As shown in the figure, the physical LSN at the end of the last sector is 3.4200.0. Accordingly, the physical LSN associated with each of the sectors in the region may be calculated by determining the sector's position in the region relative to the last sector.

The minimum and maximum virtual LSNs for client 0 are also shown for illustration. As described above, the minimum and maximum virtual LSNs for each client in a region are contained in an owner referral associated with the region. For the region represented by owner array 900, the minimum virtual LSN for client 0 (i.e., the virtual LSN at the start of the first log block owned by client 0) is 2.9000.0 and the maximum virtual LSN (i.e., the virtual LSN at the start of the last log block owned by client 0) is 3.3800.0. The virtual LSNs for other log blocks owned by client 0 in the region are not readily known and are calculated using the mapping process described in detail in conjunction with FIG. 10.

FIG. 10 is an operational flow diagram generally illustrating a process for locating a log block containing the requested log record identified by a virtual LSN (i.e., a target virtual LSN) once the correct region has been identified. FIG. 10, in conjunction with the exemplary owner array illustrated in FIG. 9, show how the log block identified by a target virtual LSN is located. For the purpose of illustration, the requested log record is owned by client 0 and has a target LSN of 3.2600.2.

Process 905 begins at block 910 where the minimum virtual LSN for a client in the correct region is determined by consulting the owner referral of the region. In FIG. 9, the minimum virtual LSN for client 0 is 2.9000.0.

Moving to decision block 915, a determination is made whether the minimum virtual LSN corresponds to the target virtual LSN. If so, then the first log block associated with the client includes the requested log record. The identified log block may be retrieved from the correct region and returned to the client, so the process ends. In FIG. 9, the minimum virtual LSN for client 0 is 2.9000.0, which does not correspond to the target LSN of 3.2600.2.

If the minimum virtual LSN does not correspond to the target virtual LSN, process 905 moves to block 920 where the log block indicated by the minimum virtual LSN is located. The log block may be located by consulting the owner array of the correct region. In FIG. 9, the owner array 900 indicates that the log block indicated by the minimum virtual LSN for client 0 is the first log block, which containing three sectors.

Next, process 905 moves to block 925 where the physical LSN of the end of the current log block is determined. During the first pass, the current log block will be the log block identified at block 920. However, subsequent passes through block 925 may evaluate later log blocks. As mentioned, the physical LSN of each sector in the region may be computed using the physical LSN indicated by the log block header of the owner page as a benchmark. For the owner array 900 in FIG. 9, the physical LSN at the end of the first log block is 3.0600.0.

Process 905 continues at decision block 930 where a determination is made whether the physical LSN at the end of the current log block corresponds to the target virtual LSN. The physical LSN of the current log block corresponds to the virtual LSN of the next log block belonging to client 0. It is so because following an append of a particular client's log block to the physical log, the physical LSN at the end of the appended log block is returned to the client. The returned physical LSN is used as the starting virtual LSN for the next log block of the client. Accordingly, as shown in FIG. 9, physical LSN 3.0600.0 (physical LSN at the end of the first log block) is the virtual LSN of the next log block owned by client 0.

If the physical LSN at the end of the current log block (i.e., the virtual LSN at the start of the next log block) corresponds to the target virtual LSN, then the next log block associated with the client includes the requested log record. The identified log block may be retrieved from the physical log and returned to the client, and the process ends. In FIG. 9, the physical LSN at the end of the first block (3.0600.0) does not correspond to the target virtual LSN (3.2600.2), and, accordingly, the process continues.

If the physical LSN at the end of the log block does not correspond to the target virtual LSN, process 905 moves to block 935 where the client's next log block is located. Process 905 returns to block 925 and repeats until the target LSN is located. In FIG. 9, the virtual LSN associated with the next log block is 3.2600.0 (i.e., the physical LSN of the client's last log block). This log block corresponds to the target virtual LSN 3.2600.2. The requested log record is the second log record in the log block identified by virtual LSN 3.2600.0. By referring to the physical LSN computations (i.e., the column right of the owner array), the physical LSN of 3.3200.0 is identified for the log block. So finally, the log block may be retrieved from the region and returned to the client, and the process ends.

The above specification, examples and data provide a complete description of the invention. Since many embodiments of the invention can be made without departing from the spirit and scope of the invention, the invention resides in the claims hereinafter appended.

What is claimed is:

1. In a transactional logging system, a computer-implemented method for locating a log record in a transactional log, the transactional log having a plurality of regions, the log record being associated with a client, the computer-implemented method comprising:

receiving a virtual identifier from the client, the virtual identifier identifying the log record in the transactional log; wherein each region of the transactional log includes log records and an owner page that includes information about ownership of each of the log records in the region; wherein the owner page identifies at least two clients; wherein each of the at least two clients is associated with a different application and wherein the transactional log includes log records from the at least two clients;

associating a first group of log records with an identity of the client in response to receiving the first group of log records from the client;

associating a second group of log records with an identity of a second client in response to receiving the second group of log records from the second client;

storing a destination owner page within a destination region of the transactional log, the destination owner page comprising a first range of identifiers associated with the identity of the client and a second range of identifiers associated with the identity of the second client; wherein the owner page further includes an owner page physical identifier identifying the location of the owner page in the transactional log;

determining a correct region in the transactional log from among the plurality of regions by first accessing a presumed region in the transactional log using the virtual identifier and the identity of the client and determining if the presumed region contains the log record by accessing an owner page in the presumed region and determining whether the virtual identifier is within a range of identifiers associated with the identity of the client in the owner page; and if the presumed region does not contain the log record then determining the correct region that contains the log record by accessing at least one other region in the transactional log and accessing the owner page for the other region;

calculating a log block physical identifier associated with the log block containing the log record, the calculation being based on the owner page physical identifier;

mapping the virtual identifier to the log block physical identifier for the log record in the correct region using the owner page associated with the correct region, the physical identifier corresponding to the location of the log record in the transactional log; and locating the log block containing the log record in the transactional log using the log block physical identifier.

2. The computer-implemented method of claim 1, wherein the owner page associated with the correct region includes an owner referral that is used to determine the location of the log record.

3. The computer-implemented method of claim 2, wherein the owner referral includes a range of virtual identifiers associated with the client, the range of virtual identifiers including the virtual identifier that identifies the log record.

4. The computer-implemented method of claim 1, wherein the owner page associated with the correct region includes an owner array that identifies an owner of each of the sectors in the owner page's region.

5. The computer-implemented method of claim 4, wherein the correct region includes a plurality of log blocks, the owner array identifying the log blocks associated with the client in the correct region, one of the identified log blocks containing the log record.

6. The computer-implemented method of claim 1, wherein the virtual identifier comprises a value having at least a container identification field identifying a container file in which resides at least a portion of the transactional log.

7. The computer-implemented method of claim 6, wherein the virtual identifier further comprises a second value having at least a block-offset field identifying a log block within the container file within which the log record resides.

8. The computer-implemented method of claim 7, wherein the virtual identifier further comprises a third value having at least a record sequence number field identifying where within the log block resides the log record.

9. In a transactional logging system, a computer-implemented method for identifying a current log record in a transactional log, the current log record being associated with a client, the transactional log having a last log record associated with the client, the last log record being appended to the transactional log before the current log record, the computer-implemented method comprising:

assigning a physical identifier to the last log record, the physical identifier identifying a location of the last log record within the transactional log; and assigning a virtual identifier to the current log record, the virtual identifier corresponding to the physical identifier and associating the current log record with a virtual log, the virtual log being presented to the client by the transactional logging system as a dedicated log; wherein the virtual identifier is used by the client to determine a correct region in the transactional log by first accessing a presumed region in the transactional log using the virtual identifier and an identity associated with the client and determining if the presumed region contains the current log record and if the presumed region does not contain the log record then determining the correct region that contains the log record by accessing at least one other region in the transactional log; wherein an owner page includes information about ownership of each of the log records in a particular region, the owner page comprising the identity associated with the client in association with a range of virtual identifiers; wherein the owner page further includes an owner page physical identifier identifying the location of the owner page in the transactional log; calculating a log block physical identifier associated with the log block containing the log record, the calculation being based on the owner page physical identifier; locating the log block containing the log record in the transactional log using the log block physical identifier; mapping the virtual identifier to the log block physical identifier for the log record in the correct region using the owner page associated with the correct region, the physical identifier corresponding to the location of the log record in the transactional log; wherein the owner page identifies at least two clients; wherein each of the at least two clients is associated with a different application and wherein the transactional log includes log records from the at least two clients such the owner page identifies a first client associated with a first group of log records that are received from the first client and identifies a second client associated with a second group of log records that are received from the second client; wherein the groups of log records are generated in response to the identity of the client that generated the record.

10. The computer-implemented method of claim 9, wherein each of the virtual identifier and the physical identifier further comprises a value having at least a container identification field identifying a container file.

11. The computer-implemented method of claim 10, wherein each of the virtual identifier and the physical identifier further comprises a second value having at least a block-offset field identifying a log block within the container file.

12. The computer-implemented method of claim 11, wherein each of the virtual identifier and the physical identifier further comprises a third value having at least a record sequence number field identifying at least one log record within the log block.

13. A computer-implemented method for locating a log record in a transactional log comprising:

receiving from a client a request related to a target log record in the transactional log having regions containing log records, the target log record being indicated by a virtual identifier identifying the log record in the transactional log; wherein each region of the transactional log comprises an owner page that includes information about ownership of each of the log records in the region wherein the owner page identifies at least two clients; wherein each of the at least two clients is associated with a different application and wherein the transactional log includes log records from the at least two clients; wherein a first group of log records is associated with an identity of the client in response to receiving the first group of log records from the client; wherein a second group of log records is associated with an identity of a second client in response to receiving the second group of log records from the second client;

determining if the target log record is located within a presumed region that is identified by the virtual identifier and the client; and if the target log record is not located within the presumed region then:

determining, from a plurality of owner pages, which of a plurality of regions in the transactional log is a correct region, each owner page being associated with at least one of the regions and including information identifying a range of log blocks within the associated region corresponding to the client, the correct region having a range that includes the target log record; wherein each owner page includes information about ownership of each of the log records in each of the at least one regions; wherein the owner page further includes an owner page physical identifier identifying the location of the owner page in the transactional log; wherein the owner page identifies at least two clients; wherein each of the at least two clients is associated with a different application and wherein the transactional log includes log records from the at least two clients such the owner page identifies a first client associated with a first group of log records that are received from the first client and identifies a second client associated with a second group of log records that are received from the second client; wherein the groups of log records are generated in response to the identity of the client that generated the record;

calculating a log block physical identifier associated with the log block containing the log record, the calculation being based on the owner page physical identifier;

mapping the virtual identifier to the log block physical identifier for the log record in the correct region using the owner page associated with the correct region, the physical identifier corresponding to the location of the log record in the transactional log; and locating the log block containing the log record in the transactional log using the log block physical identifier.

14. The computer-implemented method of claim 13, wherein each of the virtual identifier and the physical identifier further comprises a value having at least a container identification field identifying a container file in which resides the target log record.

15. The computer-implemented method of claim 14, wherein each of the virtual identifier and the physical identifier further comprises a second value having at least a block-offset field identifying a log block within the container file within which the target log record resides.

16. The computer-implemented method of claim 15, wherein each of the virtual identifier and the physical identifier further comprises a third value having at least a record sequence number field identifying where within the target log block resides the log record.

17. The computer-implemented method of claim 13, wherein each of the virtual identifier and the physical identifier further comprises a log sequence number (LSN), the LSN having at least a container identifier, a sector-aligned block offset and a record sequence number.

18. The computer-implemented method of claim 13, wherein determining a correct region is performed using a backout/binary search.

19. The computer-implemented method of claim 18, wherein the backout/binary search includes a backout step and a binary search step.

20. The computer-implemented method of claim 13, wherein the information identifying a range of log blocks within the associated region corresponding to the client are contained in an owner referral.

* * * * *